United States Patent [19]

Yamamoto et al.

[11] Patent Number: 5,370,956
[45] Date of Patent: Dec. 6, 1994

[54] ELECTROPHOTOGRAPHIC PHOTORECEPTOR

[75] Inventors: Hirokazu Yamamoto; Minoru Ohashi; Akira Tanaka; Shoji Tazuki, all of Tokyo, Japan

[73] Assignee: Mitsubishi Paper Mills Limited, Tokyo, Japan

[21] Appl. No.: 995,813

[22] Filed: Dec. 23, 1992

[30] Foreign Application Priority Data

Dec. 27, 1991 [JP] Japan ................................. 3-346553
Apr. 13, 1992 [JP] Japan ................................. 4-093000
Apr. 22, 1992 [JP] Japan ................................. 4-103086

[51] Int. Cl.$^5$ ............................................. G03G 5/09
[52] U.S. Cl. ..................................... 430/93; 430/83; 430/92
[58] Field of Search ................. 430/83, 91, 92, 93, 430/84, 49

[56] References Cited

U.S. PATENT DOCUMENTS

| 3,619,154 | 11/1971 | Cavagna et al. | 96/1.7 R |
| 3,682,630 | 8/1972 | Park | 96/1.6 |
| 4,418,135 | 11/1983 | Beeson et al. | 430/93 |
| 5,077,186 | 12/1991 | Kaneko et al. | 430/522 |
| 5,185,227 | 2/1993 | Yamana et al. | 430/49 |
| 5,213,930 | 5/1993 | Yamana et al. | 430/92 |

FOREIGN PATENT DOCUMENTS

| 430597 | 6/1991 | European Pat. Off. |
| 57-46245 | 3/1982 | Japan . |
| 58-42055 | 3/1983 | Japan . |
| 58-58554 | 4/1983 | Japan . |
| 58-59453 | 4/1983 | Japan . |
| 59-22053 | 2/1984 | Japan . |
| 59-78358 | 5/1984 | Japan . |
| 59-116760 | 7/1984 | Japan . |
| 59-220753 | 12/1984 | Japan . |
| 60-26949 | 2/1985 | Japan . |
| 61-156132 | 7/1986 | Japan . |
| 62-220962 | 9/1987 | Japan . |
| 1202758 | 8/1989 | Japan . |
| 348856 | 3/1991 | Japan . |
| 350557 | 3/1991 | Japan . |

OTHER PUBLICATIONS

Robillard, J. J. C. R. Acad. Sc. Paris B. (France) vol. 274, No. 6 (7 Feb. 1972), 396–399.

Primary Examiner—Marion E. McCamish
Assistant Examiner—Rosemary Ashton
Attorney, Agent, or Firm—Cushman, Darby & Cushman

[57] ABSTRACT

The invention provides an electrophotographic photoreceptor which has a practical high sensitivity to red light or infrared ray, especially semiconductor laser beam and is excellent in storage stability. The photoconductor layer of this photoreceptor comprises comprises an inorganic photoconductor, a binder resin, a sensitizing dye and optionally an acid anhydride, wherein said sensitizing dye is at least one of dye compounds represented by the following formulas [I], [II], [III] and [IV]:

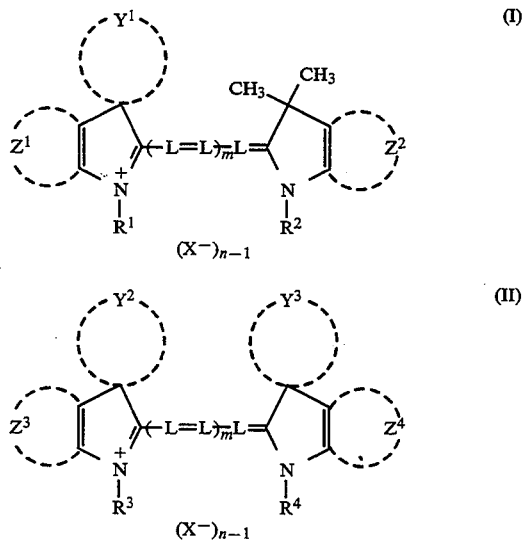

(Abstract continued on next page.)

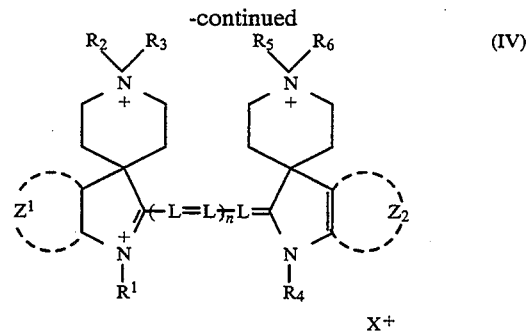
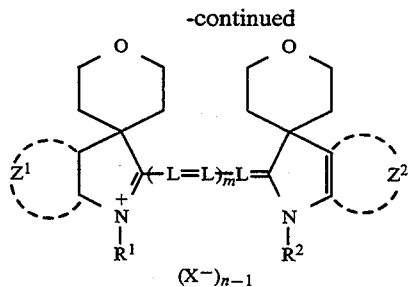
In the above formulas, the respective symbols are as defined hereinbefore.
9 Claims, No Drawings

ELECTROPHOTOGRAPHIC PHOTORECEPTOR

BACKGROUND OF THE INVENTION

The present invention relates to an electrophotographic photoreceptor having photosensitivity in the longer wavelength region and more particularly, it relates to an electrophotographic photoreceptor in which zinc oxide is used as an electroconductor and which is suitable for electrophotographic offset master adapted to exposure to semiconductor laser beams.

The conventionally used electrophotographic offset masters comprise an electroconductive support and a photoconductor layer mainly composed of photoconductive zinc oxide, a binder resin and a sensitizing dye and provided on the support.

Zinc oxide has been widely used as an electrophotographic photoreceptor because it is inexpensive, easy in handling and causes no environmental pollution. The sensitive wavelength region peculiar to zinc oxide is around ultraviolet region (380 nm) and when it is used as electrophotographic photoreceptors, in order for giving it a sensitivity to visible light, sensitizing dyes such as Rose Bengale, erythrosine, fluorescein, Methylene Blue, Crystal Violet, Bromophenol Blue and others are added thereto to carry out spectral sensitization. The conventional zinc oxide electrophotographic offset masters using these sensitizing dyes have been made by camera type direct plate making method employing a halogen lamp or the like as a light source.

Recently, scanning exposure method with laser beams is being increasingly used. This scanning exposure method has many merits as compared with conventional plate making methods since according to this scanning exposure method a direct writing in an offset master can be conducted with electrical signals from a computer and various functions such as enlargement and reduction, negative-positive conversion and screening can be imparted at the time of plate making. As the laser beam source used for this scanning exposure method, semiconductor lasers (wavelength region 700–1000 nm) which are inexpensive, small in size and make the direct conversion possible are noticed at present. However, the sensitive wavelength region of the sensitizing dyes used in the conventional zinc oxide electrophotographic offset masters is at most 650–700 nm and they do not have sensitivity to the region of 700–1000 nm and cannot be used when a semiconductor laser beam source is employed for exposure.

As electrophotographic photoreceptors applicable to exposure to a laser beam source, those which use phthalocyanine compounds are proposed in Japanese Patent Kokai (Laid-Open) Nos. 59-116760, 59-220753, 61-156132, 1-202758, 3-48856 and 3-50557. However, when these photoreceptors are used as offset masters, they suffer from the problems such as occurrence of stains in the background area, poor printing endurance and insufficient sensitivity because the photoreceptors cannot be sufficiently made insensitive to grease by etch solutions. Furthermore, use of polymethine type cyanine dyes as spectral sensitizers is disclosed in U.S. Pat. Nos. 3,619,154 and 3,682,630 and Japanese Patent Kokai (Laid-Open) Nos. 57-46245, 58-42055, 58-58554, 58-59453, 59-22053, 59-78358, 60-26949, 59-78358, 60-26949 and 62-220962. Some of them are superior in their properties, but others have the defects that when they are used for electrophotographic photoreceptors, sensitivity is insufficient and they are inferior in storage stability peculiar to polymethine dyes.

SUMMARY OF THE INVENTION

The object of the present invention is to provide an electrophotographic photoreceptor which has a practically high sensitivity to red light or infrared ray and is excellent in storage stability and more particularly to provide an electrophotographic offset master applicable to exposure to semiconductor laser beams.

That is, the present invention relates to an electrophotographic photoreceptor comprising an electroconductive support and, provided thereon, a photoconductor layer comprising an inorganic photoconductor, a binder resin and a sensitizing dye, wherein said sensitizing dye is at least one of the dye compounds represented by the following formulas [I], [II], [III] and [IV]:

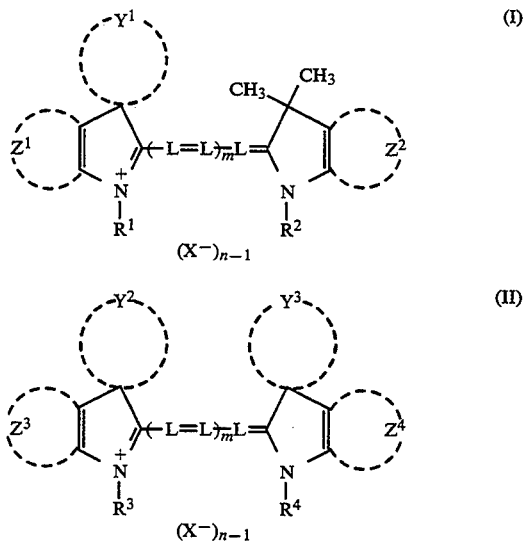

wherein $R^1$, $R^2$, $R^3$ and $R^4$ which may be identical or different each represent an alkyl group, an alkenyl group or an aralkyl group, $Y^1$, $Y^2$ and $Y^3$ which may be identical or different each represent a group of atoms necessary to form a hydrocarbon ring together with the carbon atom at the 3-position of the nitrogen-containing ring, $Z^1$, $Z^2$, $Z^3$ and $Z^4$ which may be identical or different each represent a group of atoms necessary to form a benzene ring or a naphthalene ring, L represents a methine group, m is 2 or 3, X- represents an anion, n is 1 or 2 and is 1 when the dye forms an inner salt.

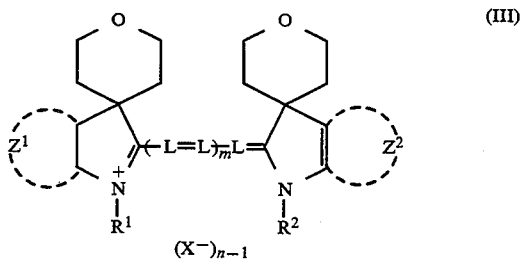

wherein $R^1$ and $R^2$ which may be identical or different each represent an alkyl group, an alkenyl group or an aralkyl group, $Z^1$ and $Z^2$ which may be identical or different each represent a group of atoms necessary to form a benzene ring or a naphthalene ring, L represents a methine group, m is 2 or 3, X- represents an anion, n is 1 or 2 and is 1 when the dye forms an inner salt.

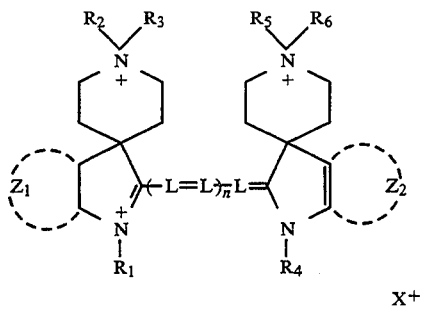

(IV)

wherein $R_1$, $R_2$, $R_4$ and $R_5$ which may be identical or different each represent a sulfoalkyl group, $R_3$ and $R_6$ which may be identical or different each represent an alkyl group, L represents a methine group, $Z_1$ and $Z_2$ each represent a group of atoms necessary to form a benzene ring or a naphthalene ring, n is an integer of 1–3 and X+ represents a cation.

DESCRIPTION OF THE INVENTION

In the above formulas [I] and [II], $R^1$, $R^2$, $R^3$ and $R^4$ may be identical or different and each represent an alkyl, alkenyl or aralkyl group which may have a substituent. Examples of $R^1$, $R^2$, $R^3$ and $R^4$ are alkyl groups such as methyl, ethyl, n-propyl, isopropyl, n-butyl and n-pentyl, alkenyl groups such as allyl and methallyl, and aralkyl groups such as benzyl, phenylethyl and α-naphthylmethyl. Examples of the substituent are sulfo group, carboxy group, phospho group, hydroxy group, halogen atom, alkoxy group and cyano group. When the substituent is an acid substituent, it may be in the form of a salt of alkali metals such as Na and K, a salt of alkaline earth metals such as Mg and Ca, an ammonium salt, and an organic ammonium salt such as triethylammonium salt, tributylammonium salt or pyridinium salt.

The hydrocarbon rings formed by $Y^1$, $Y^2$ and $Y^3$ together with the carbon atom at 3-position of the nitrogen-containing ring may be identical or different and are preferably 4- to 7-membered hydrocarbon rings. Examples of the hydrocarbon rings are cyclobutane, cyclopentane, cyclohexane and cycloheptane. Furthermore, the hydrocarbon rings of $Y^1$, $Y^2$ and $Y^3$ may have a substituent and examples of the substituent are lower alkyl groups such as methyl and ethyl.

$Z^1$, $Z^2$, $Z^3$ and $Z^4$ may be identical or different and each represent a group of atoms necessary to form a benzene ring or a naphthalene ring. $Z^1$, $Z^2$, $Z^3$ and $Z^4$ may have a substituent. Examples of the substituent are sulfo group, carboxy group, alkyl group, aralkyl group, aryl group, halogen atom, cyano group, nitro group, alkoxy group, hydroxy group, alkoxycarbonyl group, carbamoyl group, sulfamoyl group, sulfonamide group and carboxamide group. When the substituent is an acid substituent, it may be in the form of a salt of alkali metals such as Na and K, a salt of alkaline earth metals such as Mg and Ca, an ammonium salt, and an organic ammonium salt such as triethylammonium salt, tributylammonium salt or pyridinium salt.

The methine group represented by L is substituted or unsubstituted one. Examples of the substituent are halogen atom, hydroxy group, carboxy group, alkyl group, aralkyl group, aryl group, alkoxy group, alkoxycarbonyl group, carbamoyl group, sulfamoyl group, sulfonamide group and carboxamide group. Moreover, the substituents may link to each other to form a 6-membered ring containing three methine groups such as 4,4-dimethylcyclohexane. The symbol m which shows length of methine chain is 2 or 3 and is more preferably 3.

The anions represented by X- include, for example, a halogen ion, a perchlorate ion, an arylsulfonate ion, and an alkylsulfate ion. n is 1 or 2 and is 1 when the dye forms an inner salt.

In the above formula [III], $R^1$ and $R^2$ may be identical or different and each represent an alkyl, alkenyl or aralkyl group which may have a substituent. Examples of $R^1$ and $R^2$ are alkyl groups such as methyl, ethyl, n-propyl, isopropyl, n-butyl and n-pentyl, alkenyl groups such as allyl and methallyl, and aralkyl groups such as benzyl, 8-phenylethyl and α-naphthylmethyl. Examples of the substituent are sulfo group, carboxy group, phospho group, hydroxy group, halogen atom, alkoxy group and cyano group. When the substituent is an acid substituent, it may be in the form of a salt of alkali metals such as Na and K, a salt of alkaline earth metals such as Mg and Ca, an ammonium salt, and an organic ammonium salt such as a triethylammonium salt, a tributylammonium salt or a pyridinium salt.

$Z^1$ and $Z^2$ may be identical or different and each represent a group of atoms necessary to form a benzene ring or a naphthalene ring. $Z^1$ and $Z^2$ may have a substituent. Examples of the substituent are sulfo group, carboxy group, alkyl group, aralkyl group, aryl group, halogen atom, cyano group, nitro group, alkoxy group, hydroxy group, alkoxycarbonyl group, carbamoyl group, sulfamoyl group, sulfonamide group and carboxamide group. When the substituent is an acid substituent, it may be in the form of a salt of alkali metals such as Na and K, a salt of alkaline earth metals such as Mg and Ca, an ammonium salt, and an organic ammonium salt such as triethyl-ammonium salt, tributylammonium salt or pyridinium salt.

The methine group represented by L is substituted or unsubstituted one. Examples of the substituent are halogen atom, hydroxy group, carboxy group, alkyl group, aralkyl group, aryl group, alkoxy group, alkoxycarbonyl group, carbamoyl group, sulfamoyl group, sulfonamide group and carboxamide group. Moreover, the substituents may link to each other to form a 6-membered ring containing three methine groups such as 4,4-dimethylcyclohexane. The symbol m which shows length of methine chain is 2 or 3 and is more preferably 3.

The anions represented by X- include, for example, a halogen ion, a perchlorate ion, an arylsulfonate ion, and an alkylsulfate ion. n is 1 or 2 and is 1 when the dye forms an inner salt.

Examples of the compounds represented by the formulas [I], [II], [III] and [IV] used in the present invention are shown below. The present invention is not limited to these compounds.

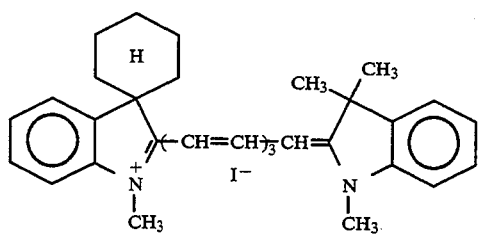
[I]-(1)
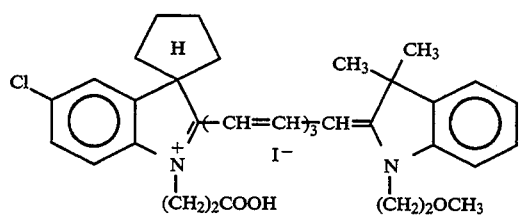
[I]-(2)
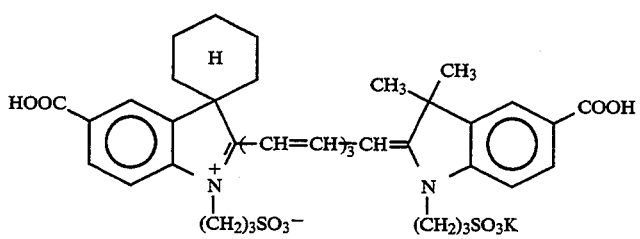
[I]-(3)
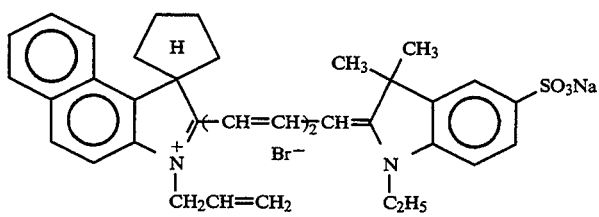
[I]-(4)
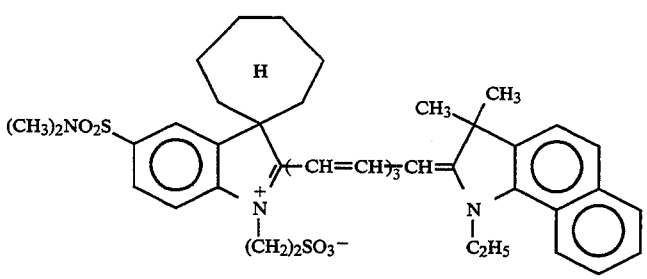
[I]-(5)
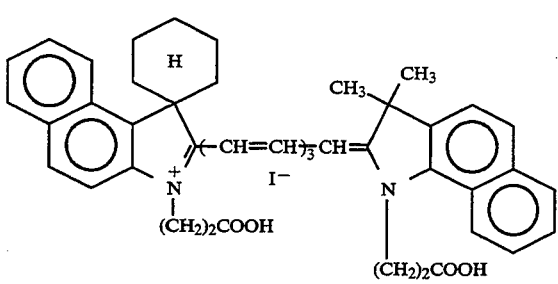
[I]-(6)

-continued
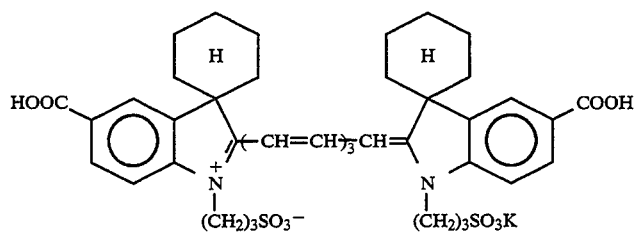
[II]-(1)
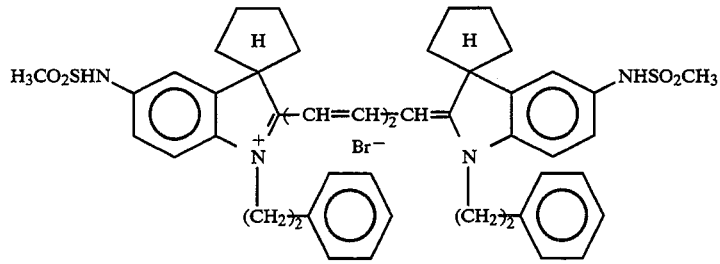
[II]-(2)
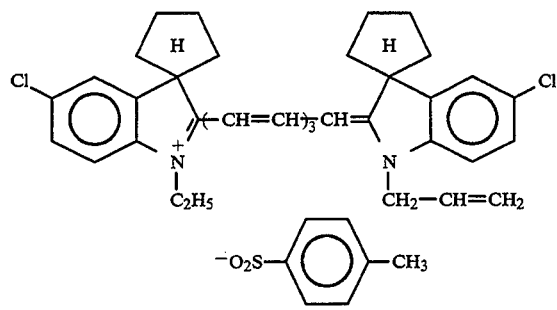
[II]-(3)
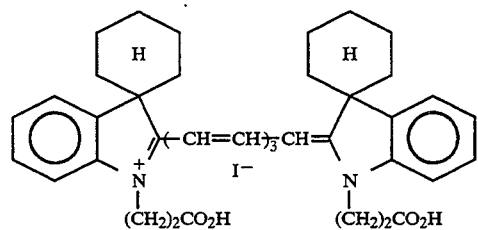
[II]-(4)
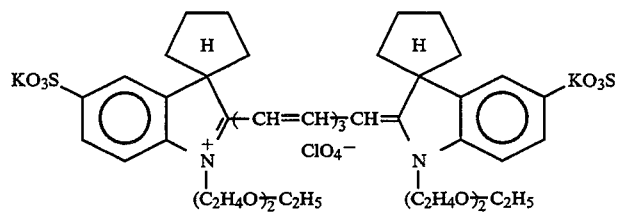
[II]-(5)
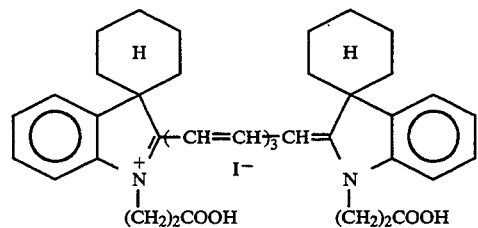
[II]-(6)

[II]-(7)
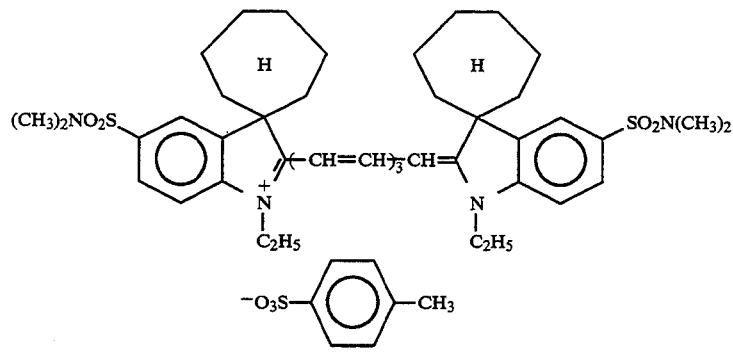
[II]-(8)
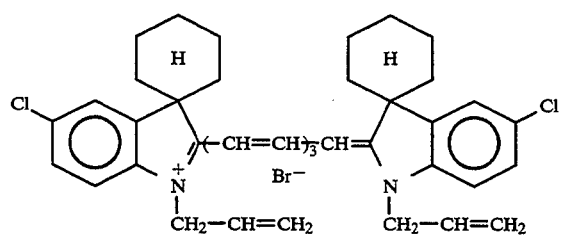
[II]-(9)
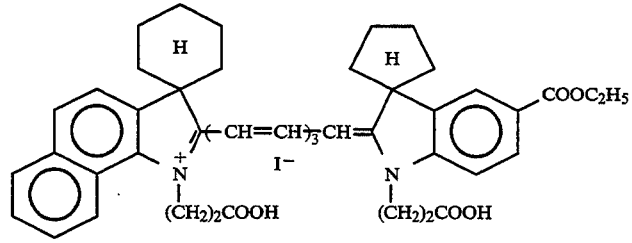
[II]-(10)
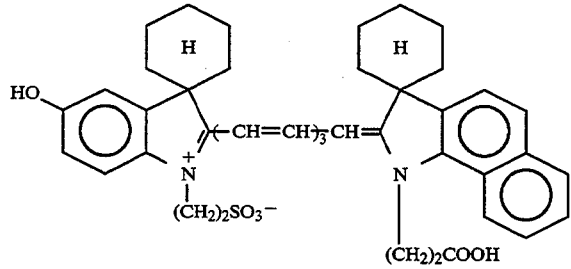
[II]-(11)
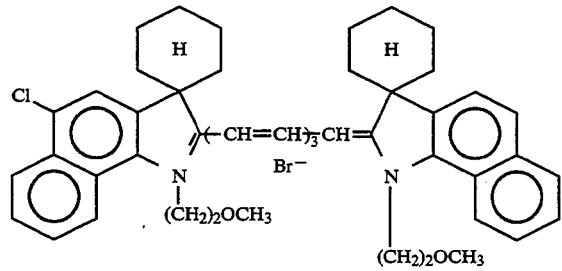
[II]-(12)
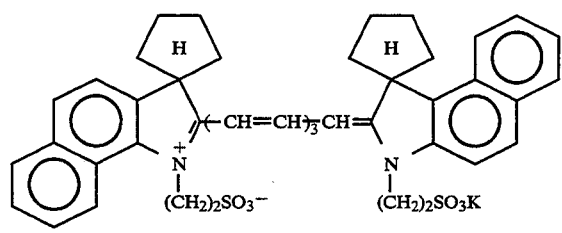

-continued
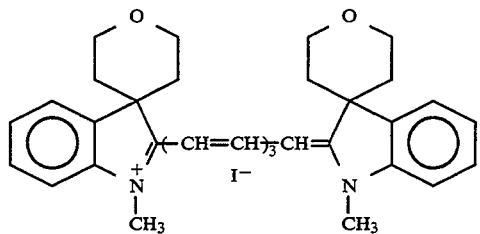
[III]-(1)
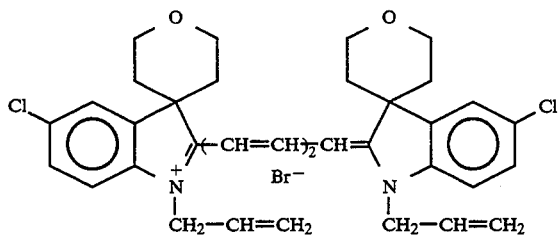
[III]-(2)
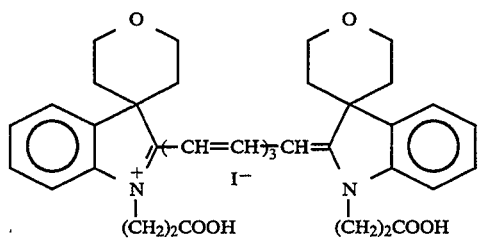
[III]-(3)
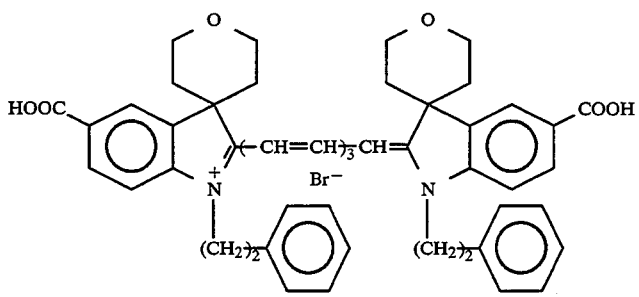
[III]-(4)
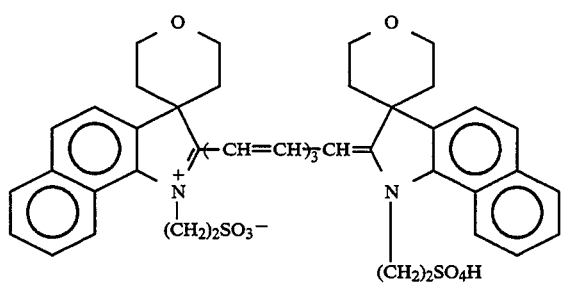
[III]-(5)
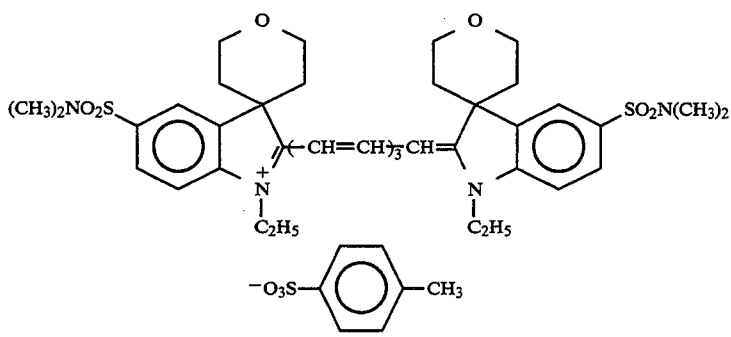
[III]-(6)

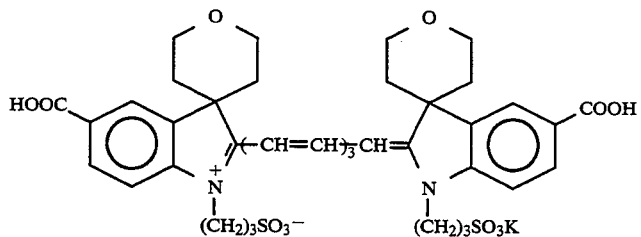
[III]-(7)
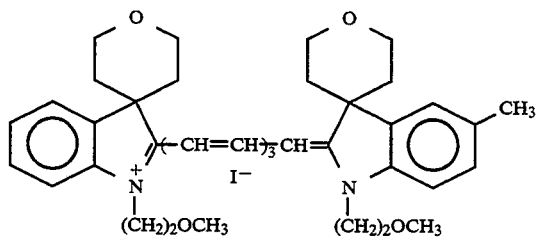
[III]-(8)
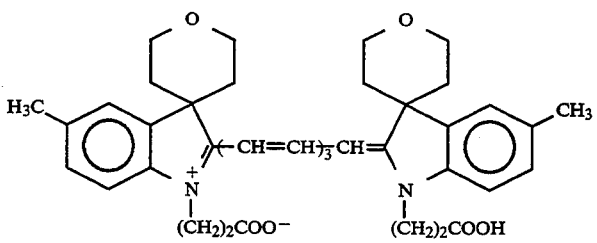
[III]-(9)
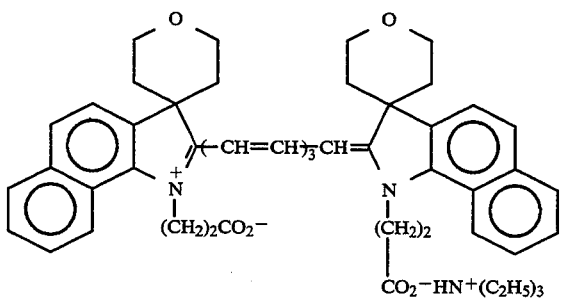
[III]-(10)
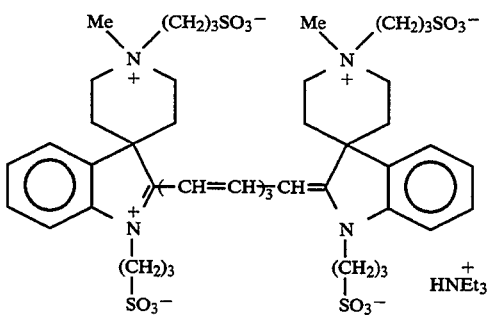
[IV]-(1)
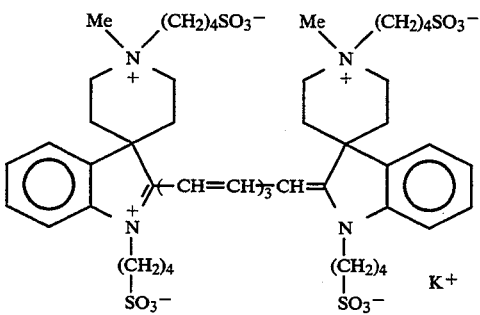
[IV]-(2)

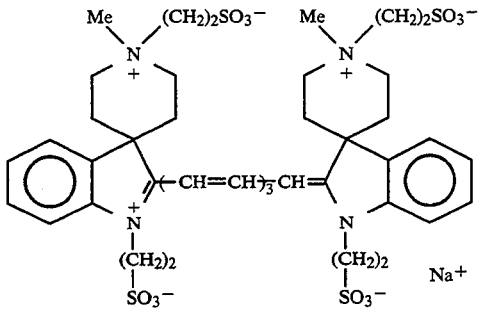

[IV]-(3)

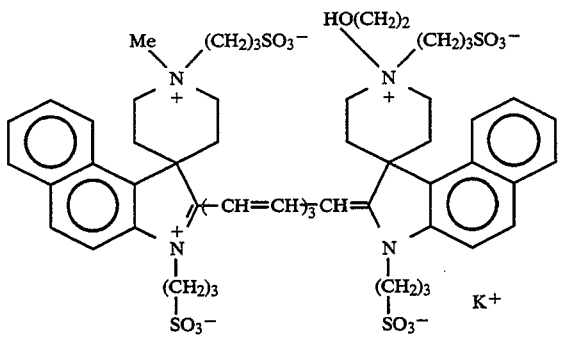

[IV]-(4)

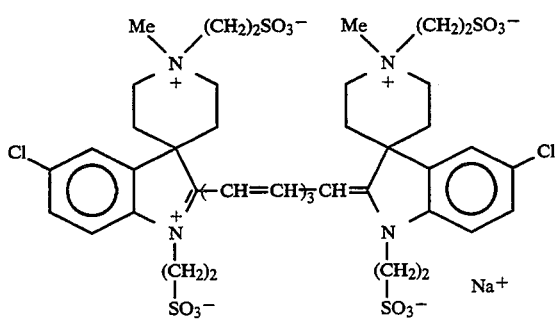

[IV]-(5)

The dye compounds used in the present invention are surprisingly much superior in sensitizing effect and storage stability to conventionally known simple polymethine cyanine dyes and it will be clear from the Examples set forth hereinafter that introduction of the spiro-ring results in spectral sensitizability and storage stability superior to those of indocyanine dyes having no spiro-ring.

The heptamethine dyes represented by the formulas [I] and [II] used in the present invention can be synthesized by known processes, such as those disclosed in Japanese Patent Kokai (Laid-Open) Nos. 2-187751 and 2-223944.

A typical example of the dyes of the present invention represented by the formula [I] is shown below. The scope of the present invention is not limited thereto.

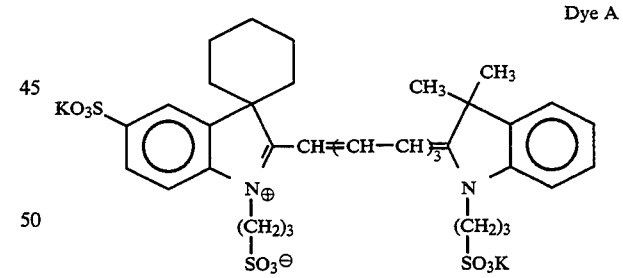

Dye A

The following is an exemplary process for synthesizing dye compounds of the formula [I]

Synthesis of the above Dye A 10.0 g of anhydro-3,3-pentamethylene-2-methyl-1-(3-sulfopropyl)-5-sulfo-3H-indolium hydroxide triethylanunonium, 9.6 g of anhydro-2-(6-acetanilide-1,3,5-hexatrienyl)-3,3-dimethyl-1-(3-sulfopropyl)-3H-indolium hydroxide and 4.0 g of potassium acetate were mixed and to the mixture was added 200 ml of methanol, followed by refluxing under heating for 30 minutes. After cooling, 200 ml of ethanol was added and the precipitated crude dye was collected by filtration. The crude dye was washed with ethanol and then recrystallized from hydrous ethanol, and dried to obtain 11.2 g of a yellowish green crystalline powder having a melting point (decomp.) of 249.0° C. The absorption maximum of an aqueous solution thereof was 747 nm.

A typical example of the dyes of the present invention represented by the formula [II] is shown below. The scope of the present invention is not limited thereto.

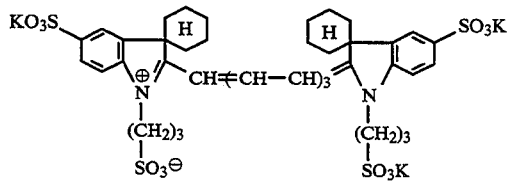

The following is an exemplary process for synthesizing dye compounds of the formula [II]

Synthesis Example (synthesis of above Dye B)

Synthesis of 2'-methyl-5'-sulfospiro[cyclohexane-1,3'-(3'H)-indole] triethylammonium salt 6.69 ml of triehtylamine was added to a solution prepared by dissolving 7.53 g of p-hydrazinobenzenesulfonic acid in 50 ml of methanol, followed by stirring at room temperature. The solvent was evaporated under reduced pressure. To the residue was added 5.04 g of methyl cyclohexyl ketone and then further added 3 ml of acetic acid, followed by heating at 85°–90° C. for 2 hours. Thereafter, 40 ml of acetic acid was added thereto, followed by refluxing under heating for 3 hours. The acetic acid was evaporated under reduced pressure and 10.14 g of the desired product was isolated by silica gel column chromatography.

Synthesis of anhydro-1',1''-di-(3-sulfopropyl)-5',5''-disulfospiro[cyclohexane-1,3'-(3'H) -indole]tricarbocyanine hydroxide tripotassium salt Then, to 5.0 g of the above obtained product was added 3.2 g of 1,3-propanesultone, followed by heating at 90°–100° C. for 2 hours. The mixture was left to stand for cooling and then, washed with ether and acetone and was added to 80 ml of methanol and 3.63 ml of triethylamine was added thereto. To the resulting solution were added 2.22 g of glutacodialdehydedianil hydrochloride and 2 ml of agetic anhydride, followed by stirring overnight at room temperature. To the reaction mixture was added a solution prepared by dissolving 6.4 g of potassium acetate in 60 ml of ethanol, followed by refluxing under heating for 15 minutes. This was left to stand for cooling and the precipitated crystal was collected by filtration, washed with ethanol, and recrystallized from hydrous ethanol to obtain 4.60 g of the desired dye.

$\lambda_{max}^{methanol} = 760$ nm $\epsilon H_2O = 2.29 \times 10^5$.

The dye compounds represented by the formula [III] used in the present invention can be synthesized by known processes, such as those disclosed in Japanese Patent Kokai (Laid-Open) No. 3-95548.

A typical example of the dyes of the present invention represented by the formula [III] is shown below. The scope of the present invention is not limited thereto.

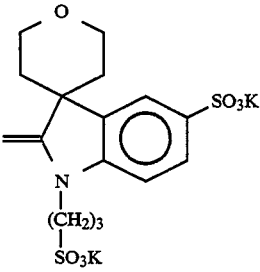

Dye C

The following is an exemplary process for synthesizing dye compounds of the formula [III]

Synthesis of the above Dye C

Step 1

Preparation of 2-methyl-5-sulfospiro[3H-indole-3,4'-tetrahydropyran]-triethyl ammonium (salt)

9.8 ml of triethylamine was added to a solution of 6.59 of p-hydrazinobenzenesulfonic acid in 30 ml of methanol to obtain a homogeneous solution. Then, to the solution was added 4.49 g of 4-acetyltetrahydropyran and refluxed for 1 hour. The solvent was evaporated under reduced pressure, followed by adding 30 ml of acetic acid and refluxing for 30 hours. Acetic acid was evaporated under reduced pressure and 7.1 g of desired oily product was isolated by silica gel column chromatography.

Step 2

1.76 g of the above intermediate and 1.22 g of 1,3-propanesultone were heated at 120°–130° C. for 3 hours. After left to stand for cooling, they were washed with ether and then dissolved in 30 ml of methanol. Thereto were added 1.40 ml of triethylamine and then 0.71 g of glutacondialdehydedianil hydrochloride and 0.7 ml of acetic a hydride, followed by stirring for 5 hours at room temperature. Thereto was added a Solution of 2.46 g of potassium acetate in 30 ml of ethanol and refluxed for 15 minutes and then temperature was returned to room temperature. Thereafter, the precipitated crystal was collected by filtration and washed with water and recrystallized from hydrous ethanol to obtain 0.9 g of the desired dye. Melting point; 300° C. or higher. $\lambda_{max} H_2O$ 757 nm $\epsilon H_2O = 2.30 \times 10^5$.

The dye compounds represented by the formula [IV] can be synthesized by known processes, such as those disclosed in Japanese Patent Kokai (Laid-Open) No. 3-96942.

Among the dye compounds of the formulas [I]-[IV] used in the present invention, those of the formulas [I], [II] and [III] are preferred in their sensitizing properties.

The content of the sensitizing dye in the photosensitive layer can be in the range of 0.0001–2.0% by weight, more preferably 0.0005–1.0% by weight based on zinc oxide. If the content of the dye is less than the above range, the effect of sensitization is not developed and if it is more than the range, the apparent sensitivity is improved, but chargeability and charge retainability in the dark decrease and besides, such amount is not desirable from economical view point.

When the photoreceptor is used as an electrophotographic offset master, the zinc oxide used in the photosensitive layer is one which has a photoconductivity, and is preferably in the form of fine powders of about 0.1–1.0 μm in average particle size.

As the binder resins used in the photosensitive layer, there may be used any of those which are well known for general electrophotographic photoreceptors. Examples of the binder resins are acrylic resins, styrene resins, silicone resins, polyester resins, epoxy resins, urethane resins, alkyd resins, vinyl chloride resins, and vinyl acetate resins. For electrophotographic offset masters, acrylic resins are preferred from the points of cost, sensitivity of the photosensitive layer and printability.

Examples of the acrylic resins are homopolymers of acrylates, methacrylates or the like and besides, copolymers of acrylates and methacrylates and copolymers of acrylates or methacrylates and styrene or vinyl acetate. Moreover, they may be modified with acrylic acid, methacrylic acid, maleic acid, phthalic acid, crotonic acid, phthalic anhydride, tiglic acid, itaconic acid, citraconic acid, allylmalonic acid and the like. These binder resins may be used each alone or in combination of two or more.

The content of the binder resin in the photosensitive layer is preferably in the range of 10–30% by weight of zinc oxide. If the content is outside the above range, sensitivity decreases, stain of the background occurs and printing endurance lowers, namely, the printability deteriorates.

Sensitizing effect is further improved by using a sensitizing aid in combination.

As the sensitizing aid, compounds having electron affinity are generally effective, but especially organic acid anhydrides show a high sensitizing effect. The organic acid anhydrides include straight chain acid anhydrides and cyclic acid anhydrides. The cyclic acid anhydrides include cyclic acid anhydrides of aliphatic dicarboxylic acids and aromatic cyclic acid anhydrides. The acid anhydrides may have or may not have a substituent.

As the straight chain acid anhydrides, mention may be made of, for example, n-caproic anhydride, propionic anhydride and trifluoroacetic anhydride.

Examples of the cyclic acid anhydrides of aliphatic dicarboxylic acids are succinic anhydrides such as succinic anhydride, methylsuccinic anhydride, ethylsuccinic anhydride, n-octylsuccinic anhydride, n-octadecenylsuccinic anhydride and s-acetylmercaptosuccinic anhydride, maleic anhydrides such as maleic anhydride, 2-chloromaleic anhydride, dichloromaleic anhydride and 2,3-dimethylmaleic anhydride, itaconic anhydride, citraconic anhydride, glutaric anhydride, adipic anhydride, isobutyric anhydride, diglycollic anhydride, cis-aconitic anhydride and 5-norbornene-2,3-dicarboxylic anhydride.

Examples of aromatic cyclic acid anhydrides are phthalic anhydrides such as phthalic anhydride, 3-nitrophthalic anhydride, methoxyphthalic anhydride, methylphthalic anhydride, chlorophthalic anhydride, tetrachlorophthalic anhydride, tetrabromophthalic anhydride, cyanophthalic anhydride and cis-hexahydrophthalic anhydride, 3,3',4,4'-benzophenonetetracarboxylic anhydride, pyromellitic anhydride, trimellitic anhydride, diphenic anhydride, 1,8-naphthalic anhydride, naphthalene-1,4,5,8-tetracarboxylic dianhydride, 3,3',4,4'-biphenyltetracarboxylic dianhydride, 3,3',4,4'-benzophenonetetracarboxylic dianhydride and cis-cyclohexene-1,2-dicarboxylic anhydride.

These acid anhydrides interact with the surface of zinc oxide to conspicuously improve chargeability and charge retainability of the photoreceptors and besides, accelerate the sensitizing effect of the sensitizing dyes used in the present invention. Furthermore, some of these acid anhydrides improve storage stability of the sensitizing dyes.

The content of these acid anhydrides when these are used may be in the range of 0,001–1.0% by weight, preferably in the range of 0.01–0.5% by weight. If the content is less than the above range, the effects on chargeability, charge retainability in the dark and sensitization are not developed and if it is more than the above range, the apparent sensitivity is improved, but chargeability and charge retainability in the dark extremely deteriorate.

As the electroconductive support used in the electrophotographic photoreceptors, especially, offset masters, there may be used known supports. Generally, the supports for the electrophotographic photosensitive layer are preferably electroconductive and include, for example, papers and plastic film to the surface of which electroconductivity, solvent resistance and water resistance are imparted, papers laminated with plastics, metallic sheets, metallic foils, and papers and plastic films clad with a metallic foil.

The coating solution for forming the photosensitive layer of the electrophotographic offset masters according to the present invention is prepared by mixing and dispersing respectively given amounts of zinc oxide, sensitizing dye, sensitizing aid and binder resin together with organic solvent (such as toluene, xylene, benzene, acetone and methyl ethyl ketone) by a mixing and dispersing machine (such as ball mill, sand grinder, or paint conditioner).

The resultant coating solution is coated on the support by coating methods such as wire bar coating, reverse roll coating and air knife coating and hot-air dried to form an electrophotographic photosensitive layer. The thickness of the photosensitive layer concerns with chargeability and sensitivity and affects the printability and is preferably 5–25 μm, more preferably 10–20 μm.

In the above, explanation is made of electrophotographic offset masters using zinc oxide as the inorganic photoconductor, but electrophotographic photoreceptors can also be similarly produced by using titanium oxide, zinc sulfide, cadmium sulfide and the like as the inorganic photoconductor.

The following nonlimiting examples explain the present invention in more detail.

EXAMPLE 1

100 parts by weight of a photoconductive zinc oxide (SAZEX #2000 manufactured by Sakai Chemical Co.), 50 parts by weight of an acrylic resin (DIANAL LR-118 manufactured by Mitsubishi Rayon Co., Ltd., solid content 40%), 150 parts by weight of toluene and 10 parts by weight of a solution containing $1 \times 10^{-2}$ mol/liter of the heptamethine cyanine dye of the dye compound [I]-(1) in methyl alcohol were mixed and kneaded in a porcelain ball mill for 2 hours to prepare a zinc oxide photosensitive solution. This photosensitive solution was coated on a paper having electroconductivity, solvent resistance and water resistance by a wire bar and hot-air dried to form a photosensitive layer of about 15 μm in thickness.

The resulting electrophotographic photoreceptor was subjected to conditioning in the dark of the atmosphere of 20° C. and 65% RH for 24 hours. Thereafter, electrophotographic characteristics of the photoreceptor were measured in the following manner. The measurement was conducted using the paper analyzer SP-428 (manufactured by Kawaguchi Electric Mfg. Co., Ltd.) in which the light source part was remodeled. That is, a semiconductor laser projector was provided in the light source part so that a laser beam (oscillated wavelength: 780 nm; output: 2 mW; gallium-aluminum-arsenic semiconductor laser) emitted from the projector can be irradiated to the photoreceptor via a reflective mirror. Charging of the photoreceptor was carried out by the static method. The photoreceptor was evaluated by measuring the initial charging potential $V_0$ (V), namely, the surface potential just after the charging and the half decay exposure $E_{\frac{1}{2}}$ (erg/cm$^2$), namely, the exposure required for the one-half decay of the surface potential measured after 10 seconds from the charging. The results are shown in Table 1.

Reflectance spectra of this photoreceptor just after preparation and after subjected to heat treatment at 80° C. for 12 hours were measured and absorbances at maximum absorption in the range of 700–850 nm wavelength were measured. Storage stability of the dye was evaluated in terms of stability value obtained by dividing the absorbance after the heat treatment by the absorbance just after preparation. The closer to 1 the value is, the higher the storage stability is. The results are shown in Table 1. The electrophotographic characteristics after the heat treatment are also shown in Table 1. The photoreceptor which is less in change of electrophotographic characteristics before and after the heat treatment and has a stability value close to 1 is an electrophotographic photoreceptor which is excellent in storage stability.

EXAMPLE 2

A photoreceptor was prepared in the same manner as in Example 1 except that the heptamethine cyanine dye of [II]-(1) was used as the sensitizing dye. The resulting photoreceptor was evaluated on the electrophotographic characteristics and storage stability as in Example 1. The results are shown in Table 1.

EXAMPLE 3

A photoreceptor was prepared in the same manner as in Example 1 except that the heptamethine cyanine dye of [II]-(9) was used as the sensitizing dye and 40 parts by weight of DESORT E-048 (solid content 50%) manufactured by Nagase Kasei Co. was used as the acrylic resin. The resulting photoreceptor was evaluated on the electrophotographic characteristics and storage stability as in Example 1. The results are shown in Table 1.

COMPARATIVE EXAMPLE 1

A photoreceptor was prepared in the same manner as in Example 1 except that a heptamethine cyanine dye having the following formula was used as the sensitizing dye. The resulting photoreceptor was evaluated on the electrophotographic characteristics and storage stability as in Example 1. The results are shown in Table 1.

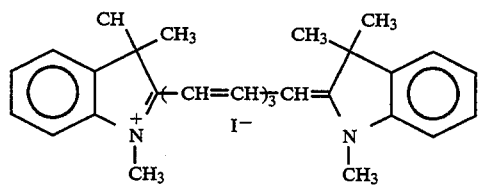

COMPARATIVE EXAMPLE 2

A photoreceptor was prepared in the same manner as in Example 1 except that a heptamethine cyanine dye having the following formula was used as the sensitizing dye. The resulting photoreceptor was evaluated on the electrophotographic characteristics and storage stability as in Example 1. The results are shown in Table 1.

TABLE 1

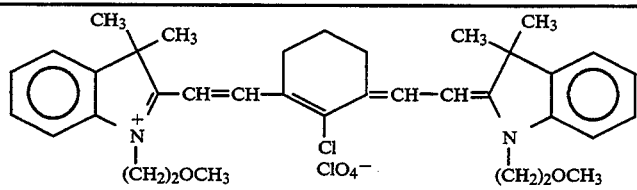

| Sample | Electrophotographic characteristics | | | | After heat treatment at 80° C. for 12 hours |
|---|---|---|---|---|---|
| | Just after preparation | | After heat treatment | | |
| | $V_0$ (−V) | $E_{\frac{1}{2}}$ (erg/cm$^2$) | $V_0$ (−V) | $E_{\frac{1}{2}}$ (erg/cm$^2$) | Stability |
| Example 1 | 560 | 59.3 | 566 | 65.5 | 0.83 |
| Example 2 | 563 | 47.0 | 570 | 51.3 | 0.88 |
| Example 3 | 555 | 45.3 | 561 | 48.0 | 0.89 |
| Comparative Example 1 | 568 | 96.2 | 572 | 183.4 | 0.56 |
| Comparative Example 2 | 561 | 82.3 | 569 | 153.2 | 0.64 |

As can be seen from Table 1, the photoreceptors of Examples 1–3 had high sensitivities to the semiconductor laser beam (wavelength 780 nm). Besides, they were less in change of electrophotographic characteristics after the heat treatment and had high stability and thus excellent in storage stability.

EXAMPLE 4

100 parts by weight of a photoconductive zinc oxide (SAZEX #2000 manufactured by Sakai Chemical Co.), 0.40 part by weight of phthalic anhydride as a cyclic acid anhydride, 50 parts by weight of an acrylic resin (DIANAL LR-118 manufactured by Mitsubishi Rayon Co., Ltd., solid content 40%), 140 parts by weight of toluene and 10 parts by weight of a solution containing $1 \times 10^{-2}$ mol/liter of the heptamethine cyanine dye of the dye compound [I]-(3) in methyl alcohol were mixed and kneaded in a porcelain ball mill for 2 hours to prepare a zinc oxide photosensitive solution. This photosensitive solution was coated on a paper having electroconductivity, solvent resistance and water resistance by a wire bar and hot-air dried to form a photosensitive layer of about 15 μm in thickness.

The resulting electrophotographic photoreceptor was subjected to conditioning in the dark of the atmosphere of 20° C. and 65% RH for 24 hours. Thereafter, electrophotographic characteristics of the photoreceptor were measured in the same manner as in Example 1 except that a dark decay retention D.D. (%) which is the ratio of the surface potential after dark decaying for 10 seconds to the initial potential $V_0$ was additionally obtained. The results are shown in Table 2.

Furthermore, storage stability of the dye was also evaluated in the same manner as in Example 1. The results are shown in Table 2. The electrophotographic characteristics of the photoreceptor after subjected to the heat treatment are also shown in Table 2.

EXAMPLE 5

A photoreceptor was prepared in the same manner as in Example 4 except that dichloromaleic anhydride was used as the cyclic acid anhydride. The resulting photoreceptor was evaluated on the electrophotographic characteristics and storage stability as in Example 4. The results are shown in Table 2.

EXAMPLE 6

A photoreceptor was prepared in the same manner as in Example 4 except that the heptamethine cyanine dye of [I]-(6) was used as the sensitizing dye and pyromellitic anhydride was used as the cyclic acid anhydride. The resulting photoreceptor was evaluated on the electrophotographic characteristics and storage stability as in Example 4. The results are shown in Table 2.

EXAMPLE 7

A photoreceptor was prepared in the same manner as in Example 4 except that the heptamethine cyanine dye of [II]-(9) was used as the sensitizing dye, ethylsuccinic anhydride was used as the cyclic acid anhydride and 40 parts by weight of DESORT E-048 (solid content 50%) manufactured by Nagase Kasei Co. was used as the acrylic acid. The resulting photoreceptor was evaluated on the electrophotographic characteristics and storage stability as in Example 4. The results are shown in Table 2.

EXAMPLE 8

A photoreceptor was prepared in the same manner as in Example 4 except that tetrachlorophthalic anhydride was used as the cyclic acid anhydride. The resulting photoreceptor was evaluated on the electrophotographic characteristics and storage stability as in Example 4. The results are shown in Table 2.

COMPARATIVE EXAMPLE 3

A photoreceptor was prepared in the same manner as in Example 4 except that a heptamethine cyanine dye having the following formula was used as the sensitizing dye. The resulting photoreceptor was evaluated on the electrophotographic characteristics and storage stability as in Example 4. The results are shown in Table 2.

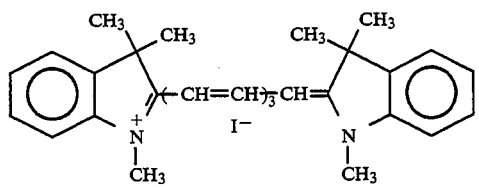

COMPARATIVE EXAMPLE 4

A photoreceptor was prepared in the same manner as in Example 4 except that a heptamethine cyanine dye having the following formula was used as the sensitizing dye. The resulting photoreceptor was evaluated on the electrophotographic characteristics and storage stability as in Example 4. The results are shown in Table 2.

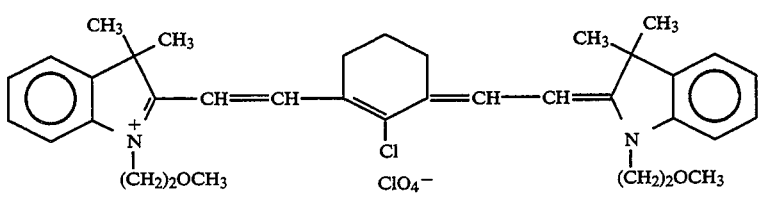

COMPARATIVE EXAMPLE 5

A photoreceptor was prepared in the same manner as in Example 4 except that the cyclic acid anhydride was not used. The resulting photoreceptor was evaluated on the electrophotographic characteristics and storage stability as in Example 4. The results are shown in Table 2.

TABLE 2

| Sample | Electrophotographic characteristics | | | | | | After heat treatment at 80° C. for 12 hours Stability |
|---|---|---|---|---|---|---|---|
| | Just after preparation | | | After heat treatment | | | |
| | $V_0$ (−V) | D.D (%) | $E_{\frac{1}{2}}$ (erg/cm²) | $V_0$ (−V) | D.D (%) | $E_{\frac{1}{2}}$ (erg/cm²) | |
| Example | | | | | | | |
| 4 | 580 | 91.0 | 37.3 | 586 | 92.0 | 40.5 | 0.92 |
| 5 | 583 | 90.2 | 35.7 | 585 | 91.5 | 39.2 | 0.93 |
| 6 | 585 | 90.5 | 34.1 | 591 | 90.8 | 37.4 | 0.90 |
| 7 | 582 | 91.5 | 36.4 | 586 | 92.0 | 40.1 | 0.91 |
| 8 | 587 | 90.6 | 34.0 | 592 | 91.0 | 37.3 | 0.94 |

TABLE 2-continued

| | Electrophotographic characteristics | | | | | | After heat treatment at 80° C. for 12 hours Stability |
|---|---|---|---|---|---|---|---|
| | Just after preparation | | | After heat treatment | | | |
| Sample | $V_0$ (—V) | D.D (%) | $E_{\frac{1}{2}}$ (erg/cm²) | $V_0$ (—V) | D.D (%) | $E_{\frac{1}{2}}$ (erg/cm²) | |
| Comparative Example | | | | | | | |
| 3 | 578 | 91.2 | 83.4 | 582 | 92.0 | 100.1 | 0.73 |
| 4 | 581 | 92.2 | 64.5 | 585 | 92.5 | 83.9 | 0.64 |
| 5 | 568 | 82.2 | 43.5 | 572 | 84.5 | 47.9 | 0.87 |

As can be seen from Table 2, the photoreceptors of Examples 4–8 had high sensitivities to the semiconductor laser beam (wavelength 780 nm) and were excellent in dark decay retention. Besides, they were less in change of electrophotographic characteristics after the heat treatment and had high stability and thus excellent in storage stability.

EXAMPLE 9

Printing characteristics of the photoreceptors obtained in Examples 4–8 were evaluated. That is, printing plates were made from the photoreceptors using 1440ES Plate-setter plate-making machine (manufactured by Printware Co.). The resulting plates were subjected to etch treatment with an etch solution LOM-OH for Diafax master (manufactured by Mitsubishi Paper Mills, Ltd.) and then printing to woodfree papers was carried out using these plates by TOKO MODEL 810 small offset printing machine (manufactured by Tokyo Koku Keiki Co.). The plates made from the photoreceptors of Examples 4–8 had a printing endurance of more than 5000 prints and caused no stain in the background and thus, good prints were obtained.

EXAMPLE 10

100 parts by weight of a photoconductive zinc oxide (SAZEX #2000 manufactured by Sakai Chemical Co.), 50 parts by weight of an acrylic resin (DIANAL LR-118 manufactured by Mitsubishi Rayon Co., Ltd., solid content 40%), 150 parts by weight of toluene and 10 parts by weight of a solution containing $1 \times 10^{-2}$ mol/liter of the heptamethine cyanine dye of the dye compound [III]-(3) in methyl alcohol were mixed and kneaded in a porcelain ball mill for 2 hours to prepare a zinc oxide photosensitive solution. This photosensitive solution was coated on a paper having electroconductivity, solvent resistance and water resistance by a wire bar and hot-air dried to form a photosensitive layer of about 15 μm in thickness.

The electrophotographic characteristics of the photoreceptor were measured in the same manner as in Example 4. The results are shown in Table 3.

Furthermore, storage stability of the dye was also evaluated in the same manner as in Example 4. The results are shown in Table 3. The electrophotographic characteristics of the photoreceptor after subjected to the heat treatment are also Shown in Table 3.

EXAMPLE 11

A photoreceptor was prepared in the same manner as in Example 10 except that the heptamethine cyanine dye of [III]-(7) was used as the sensitizing dye. The resulting photoreceptor was evaluated on the electrophotographic characteristics and storage stability as in Example 10. The results are shown in Table 3.

EXAMPLE 12

A photoreceptor was prepared in the same manner as in Example 10 except that the heptamethine cyanine dye of [III]-(10) was used as the sensitizing dye and 40 parts by weight of DESORT E-048 (solid content 50%) manufactured by Nagase Kasei Co. was used as the acrylic resin. The resulting photoreceptor was evaluated on the electrophotographic characteristics and storage stability as in Example 10. The results are shown in Table 3.

COMPARATIVE EXAMPLE 6

A photoreceptor was prepared in the same manner as in Example 10 except that a heptamethine cyanine dye having the following formula was used as the sensitizing dye. The resulting photoreceptor was evaluated on the electrophotographic characteristics and storage stability as in Example 10. The results are shown in Table 3.

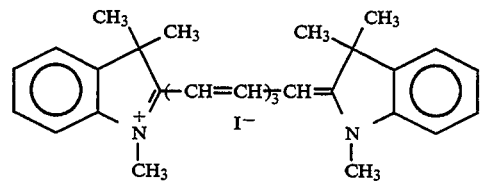

COMPARATIVE EXAMPLE 7

A photoreceptor was prepared in the same manner as in Example 10 except that a heptamethine cyanine dye having the following formula was used as the sensitizing dye. The resulting photoreceptor was evaluated on the electrophotographic characteristics and storage stability as in Example 10. The results are shown in Table 3.

TABLE 3

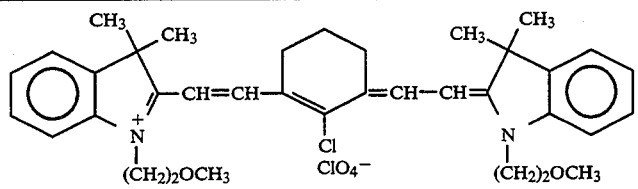

| Sample | Electrophotographic characteristics | | | | | | After heat treatment at 80° C. for 12 hours |
|---|---|---|---|---|---|---|---|
| | Just after preparation | | | After heat treatment | | | |
| | $V_0(-V)$ | D.D (%) | $E_{\frac{1}{2}}$ (erg/cm²) | $V_0(-V)$ | D.D (%) | $E_{\frac{1}{2}}$ (erg/cm²) | Stability |
| Example 10 | 578 | 91.0 | 34.3 | 582 | 91.5 | 37.9 | 0.92 |
| Example 11 | 580 | 90.6 | 36.5 | 584 | 91.0 | 39.5 | 0.93 |
| Example 12 | 586 | 91.3 | 37.3 | 590 | 91.8 | 41.2 | 0.91 |
| Comparative Example 6 | 578 | 91.2 | 83.4 | 582 | 92.0 | 100.1 | 0.73 |
| Comparative Example 7 | 581 | 92.2 | 64.5 | 585 | 92.5 | 83.9 | 0.64 |

As can be seen from Table 3, the photoreceptors of Examples 10-12 had high sensitivities to the semiconductor laser beam (wavelength 780 nm). Besides, they were less in change of electrophotographic characteristics after the heat treatment and had high stability and thus excellent in storage stability.

EXAMPLE 13

Printing characteristics of the photoreceptors obtained in Examples 10-12 were evaluated in the same manner as in Example 9 to obtain the similar good results to those of Example 9.

As explained above, the electrophotographic photoreceptors of the present invention have practically high sensitivity to red color lights or infrared radiations, especially semiconductor laser beams and are excellent in storage stability. According to the present invention, it becomes possible to conduct scanning exposure with semiconductor laser beams which has been considered difficult for the zinc oxide electrophotographic photoreceptors and electrophotographic offset masters adaptable to semiconductor laser beam exposure can be put to practical use.

What is claimed is:

1. An electrophotographic photoreceptor comprising an electroconductive support and, provided thereon, a photoconductor layer comprising an inorganic photoconductor, a binder resin and a sensitizing dye, wherein said sensitizing dye is at least one of the dye compounds represented by the following formulas (I), (II) and (III):

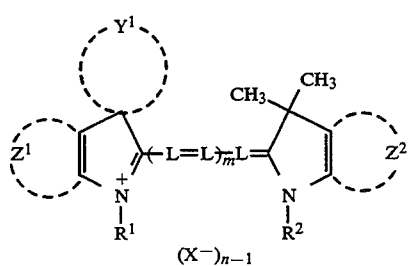

(I)

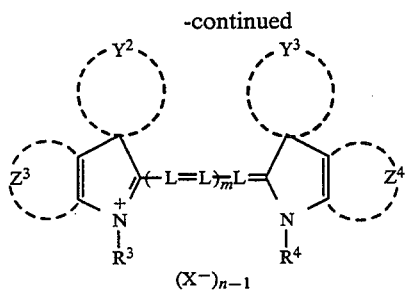

(II)

wherein $R^1$, $R^2$, $R^3$ and $R^4$ which may be identical or different each represent an alkyl group, an alkenyl group or an aralkyl group, $Y^1$, $Y^2$ and $Y^3$ which may be identical or different each represent a group of atoms necessary to form a hydrocarbon ring together with the carbon atom at the 3-position of the nitrogen-containing ring, $Z^1$, $Z^2$, $Z^3$ and $Z^4$ which may be identical or different each represent a group of atoms necessary to form a benzene ring or a naphthalene ring, L represents a methine group, m is 2 or 3, X- represents an anion, n is 1 or 2 and is 1 when the dye forms an inner salt,

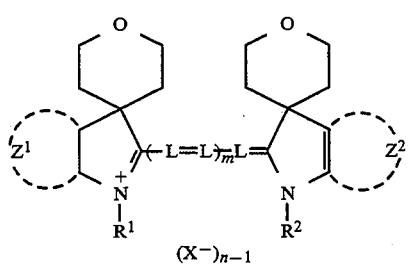

(III)

wherein $R^1$ and $R^2$ which may be identical or different each represent an alkyl group, an alkenyl group or an aralkyl group, $Z^1$ or $Z^2$ which may be identical or different each represent a group of atoms necessary to form a benzene ring or a naphthalene ring, L represents a methine group, m is 2 or 3, X- represents an anion, n is 1 or 2 and is 1 when the dye forms an inner salt.

2. An electrophotographic photoreceptor according to claim 1, wherein the photoconductor layer additionally contains an acid anhydride as a sensitizing aid.

3. An electrophotographic photoreceptor according to claim 2, wherein the acid anhydride is a cyclic acid anhydride.

4. An electrophotographic photoreceptor according to claim 2, wherein content of the acid anhydride in the photoconductor layer is 0.001–1.0% by weight based on the inorganic photoconductor.

5. An electrophotographic photoreceptor according to claim 1, wherein the inorganic photoconductor is zinc oxide.

6. An electrophotographic photoreceptor according to claim 4, wherein the zinc oxide has a particle size of about 0.1–1.0 $\mu$m.

7. An electrophotographic photoreceptor according to claim 1, wherein content of the sensitizing dye in the photoconductor layer is 0.0001–2.0% by weight based on the inorganic photoconductor.

8. An electrophotographic photoreceptor according to claim 1, which is for exposure to red light or infrared ray.

9. An electrophotographic photoreceptor according to claim 1, which is for exposure to semiconductor laser beam.

* * * * *